United States Patent [19]
Ball, Sr. et al.

[11] Patent Number: 5,219,254
[45] Date of Patent: Jun. 15, 1993

[54] EXPANDABLE FASTENER AND LOCKING MEANS THEREFOR

[76] Inventors: Earl D. Ball, Sr.; Earl D. Ball, Jr., both of P.O. Box 188, Harlan, Ky. 40801

[21] Appl. No.: 835,393

[22] Filed: Feb. 14, 1992

[51] Int. Cl.$^5$ .................................. F16B 39; F16B 02
[52] U.S. Cl. ........................................ 411/271; 411/55; 411/954
[58] Field of Search ............... 411/271, 395, 353, 517, 411/518, 116, 954, 55, 935, 325

[56] References Cited

U.S. PATENT DOCUMENTS

| | | | |
|---|---|---|---|
| 948,938 | 2/1910 | Skidmore | 411/55 |
| 990,065 | 4/1911 | Sargeant . | |
| 1,043,298 | 11/1912 | Clark | 411/517 X |
| 1,166,049 | 12/1915 | Hyde | 411/954 X |
| 2,428,341 | 9/1947 | Schaaff | 411/116 |
| 3,042,094 | 7/1962 | Lilieberg . | |

FOREIGN PATENT DOCUMENTS

| | | | |
|---|---|---|---|
| 54792 | 12/1890 | Fed. Rep. of Germany | 411/271 |
| 362413 | 1/1923 | Fed. Rep. of Germany | 411/271 |
| 584119 | 1/1925 | France | 411/271 |
| 1197234 | 11/1959 | France | 411/55 |
| 334413 | 1/1959 | Switzerland | 411/271 |
| 19434 | 12/1889 | United Kingdom | 411/271 |
| 161871 | 4/1921 | United Kingdom . | |

*Primary Examiner*—Rodney M. Lindsey
*Attorney, Agent, or Firm*—Maurice L. Miller, Jr.

[57] ABSTRACT

A fastener assembly for use in locking relationship with an internally threaded member is disclosed which includes an expandable bolt having a cavity extending longitudinally therethrough which is cylindrically shaped on a first end segment thereof and frusto-conically shaped on a second adjoining end segment thereof. The assembly also includes an elongated draw rod having a cylindrically shaped end portion adapted for close fitting slidable engagement in the first end segment, and a frusto-conically shaped end portion or boss having a rate of taper which is greater than the rate of taper of the second cavity segment. The bolthead defines a first circularly shaped recess concentrically formed about an opening of the cavity and a larger diameter second circularly shaped recess essentrically formed around the first recess. A nut which engages a threaded end portion of the first segment of the draw rod is retained in the first recess and a split locking ring which is disposed about the nut is retained in the second recess such that the ring ends become jammed between the nut and a peripheral defining wall of the second recess as the ends of the locking ring are rotated into a narrow portion of the second recess as the nut is tightened on the spindle.

19 Claims, 2 Drawing Sheets

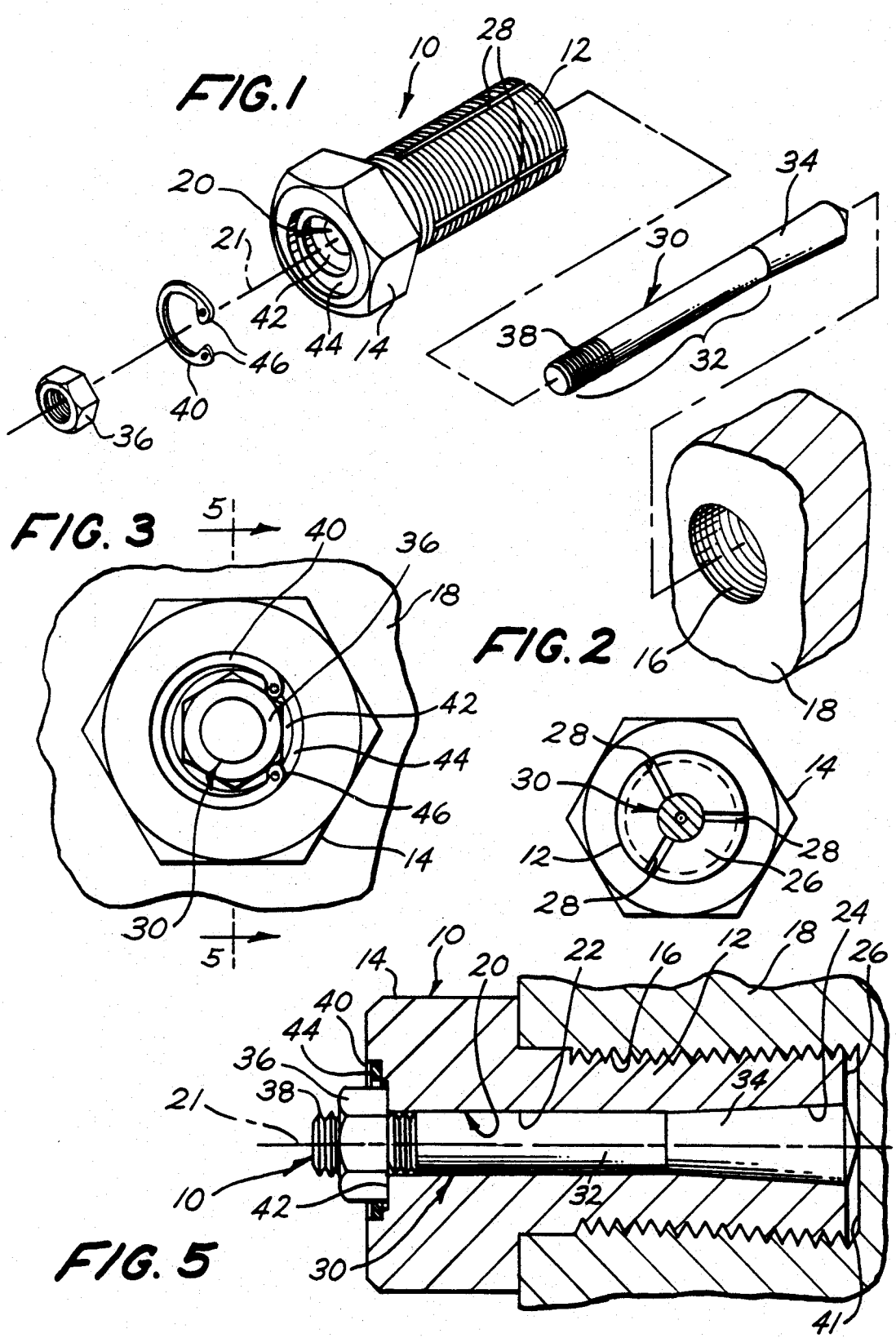

– 5,219,254 –

EXPANDABLE FASTENER AND LOCKING MEANS THEREFOR

BACKGROUND OF THE INVENTION

This invention relates to fastener assemblies of the type which employ an expandable screw body defining a cavity therethrough into which an elongated spindle having a cone shaped end portion is forced to expand an end portion of the cavity and screw body to lock the latter with the surrounding threads of a nut, tapped machinery mounting bracket, engine block bore or the like. This invention also relates to means for locking such a spindle at a desired position within the screw body to prevent accidental slippage of the spindle which might cause the screw body to unlock from an interiorly threaded member to which it is fastened.

Broadly speaking, such expandable fastener assemblies have long been known in the prior art. See, for example, U.S. Pat. No. 990,065 issued to A. L. Sargeant on Apr. 18, 1911; British Pat. No. 161,871 published Apr. 21, 1921; German Pat. No. 362413 published Jan. 27, 1923; and U.S. Pat. No. 3,042,094 issued to M. J. Liljeberg on Jul. 3, 1962. These reference patents all show expandable bolts or screw bodies which have slots formed in a threaded end portion thereof and define a cavity extending therethrough into which either a threaded expansion rod or smooth draw rod or spindle having a cone shaped end portion is inserted. In the German patent, the cavity is uniformly cylindrically shaped from one end to the other while, in each of the remaining patents, an end portion of the fastener cavity is frusto-conically shaped and tapered in conformity with the shape and taper of a cone shaped end portion or boss on a rod or spindle.

A problem which occurs in cases where the cone shaped boss on the spindle is of essentially the same size, shape and taper as the cone shaped end portion of the bolt cavity into which it is forced, is that an interior portion of the cavity is first to engage the boss. Thus, an interior annular portion of the cone shaped cavity portion begins to expand radially outwardly such that an annular gap or space occurs between an end of the cone shaped cavity at it's opening on the end of the threaded bolt body and an annular surface portion of the boss which lies in the plane containing the end of the bolt body. Such an annular gap or spacing permits a threaded end portion of the bolt body to wobble on the spindle which sets up stresses in the bolt body in a central region thereof surrounding an interior end portion of the boss which is tightly jammed against an interior end portion of the cone shaped cavity. Such stresses have been known to cause the expandable bolt body to fracture in this central region and thus fail. If the bolt is one used to secure an aircraft engine to an air frame, for example, it is obvious that such a failure can produce disastrous consequences.

Another problem that has been encountered using prior art expandable bolts to secure massive components together relates to the means used to lock the expansion rod or spindle at a desired position within the bolt cavity such that the spindle will not accidentally slip longitudinally to produce contraction of the surrounding bolt threads to thus decouple the bolt from the interiorly threaded member to which it is joined. Such slippage can occur in the reference devices due to vibration which is sufficient to loosen the spindle retaining nut which is engaged with a threaded end portion of the spindle on one end of the bolt body. To prevent such loosening, a cotter key has been used in the prior art which is inserted through a passage which extends through the side of the spindle retaining nut and through as aligned passage through the threaded end portion of the spindle. However, it is sometimes difficult to obtain the precisely desired position of the spindle in bolt cavity and securely tighten the spindle retaining nut against an end of bolt body and, at the same time, secure alignment of the passageways through the nut and spindle for insertion of the cotter key therethrough. Moreover, it is sometimes difficult to remove such a cotter key from the passageways when it is desired to remove the expandable bolt from the threaded member with which it is joined because of a slight misalignment in the nut and spindle passages which can occur due to vibration over a period of time after the assembly has been installed.

By means of our invention, these and other problems encountered using prior art expandable bolts and conventional locking means therefor are substantially reduced, if not altogether eliminated.

SUMMARY OF THE INVENTION

It is an object of our invention to provide an improved expandable fastener assembly.

It is a further object of our invention to provide an improved means for locking an expansion rod or spindle at a desired position within an expandable fastener to prevent slippage of the spindle from it's desired position which could cause the fastener to loosen from an interiorly threaded member with which it is joined.

Briefly, in accordance with our invention, an expandable fastener for use in locking relationship with an interiorly threaded member is provided. The assembly includes a screw body having an expandable, exteriorly threaded section, which body defines a cavity extending therethrough which is co-axial with a longitudinal axis thereof. The cavity includes a cylindrically shaped first segment extending from a first opening on a first end of the body to a position in a central region of the body. The cavity also includes a frusto-conically shaped second segment communicating with the first segment and extending at a first predetermined, constant rate of taper to a second opening on a second end of the body. The fastener also includes an elongated spindle having a cylindrically shaped first end portion adapted for relatively close fitting slidable engagement with the first segment and a second end portion forming a frusto-conically shaped boss extending from connection with the first end portion at a second predetermined, constant rate of taper. The taper rate of the boss is greater than the taper rate of the second cavity segment. The boss is insertable by it's smaller end into the second opening and cavity segment to radially expand the threaded section to lock the body in an interiorly threaded member.

These and other objects, features and advantages of the present invention will become apparent to those skilled in the art from the following detailed description and attached drawings upon which, by way of example, only a preferred embodiment of the invention is described and illustrated.

BRIEF DESCRIPTION OF THE DRAWINGS

FIG. 1 shows an exploded perspective view of an expandable bolt for use in securing an aircraft engine block to an air frame, a tapered pull rod for expanding the bolt, and eccentric pull rod nut locking means, thus illustrating a preferred embodiment of our invention.

FIG. 2 shows a threaded end view of the expandable bolt and tapered pull rod of FIG. 1 as assembled.

FIG. 3 shows an end view looking into the expandable bolt head of FIG. 1 together with the remaining components shown in the latter mentioned figure, all as assembled.

FIG. 5 shows a longitudinal cross section view of the assembled components of FIGS. 1-4 as reviewed along cross section lines 5—5 of FIG. 3, with the tapered pull rod locked in its operative position to secure the expandable bolt in a bore hole of the engine block.

DESCRIPTION OF THE PREFERRED EMBODIMENT

Figure 4:
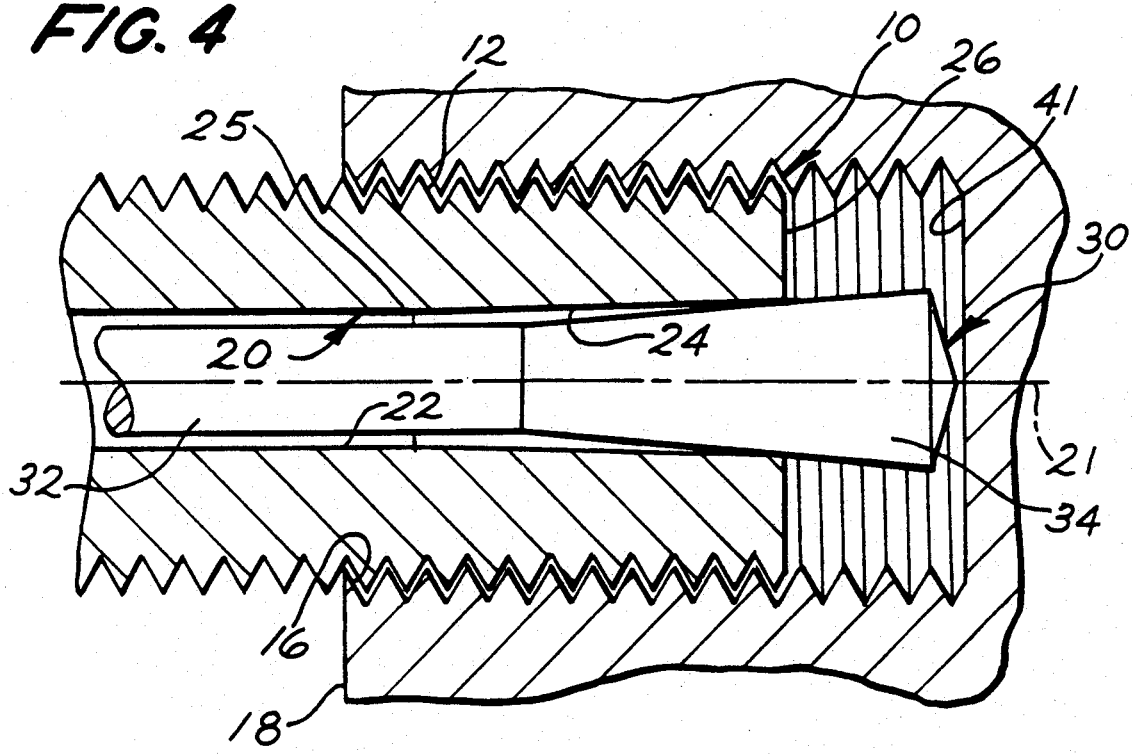
FIG. 4 shows a longitudinal cross section view of a threaded end portion of the expandable bolt of FIGS. 1-3 with the tapered pull rod of those figures being loosely inserted therein preparatory to expansion of the bolt.

Referring now to the drawing figures there is shown, in a preferred embodiment of our invention, an expandable fastener assembly which includes an elongated screw body in the form of a bolt 10 having an expandable exteriorly threaded section 12 and a bolthead 14 in the shape of a hex nut which is integrally attached to one end of the section 12. The bolt 10 is adapted for use in locking relationship with an interiorly threaded member which, in this example, comprises an interiorly threaded blind bore 16 formed in an machine body such as an engine block 18. The bolt 10 defines an elongated cavity 20 which extends therethrough and which is co-axial with a longitudinal axis 21 thereof. The cavity 20 includes a cylindrically shaped first segment 22 which opens at one end thereof on the bolthead 14, and a frusto-conically shaped second segment 24 having a small diameter end which joins the other end of the first segment 22 at a selected position 25 in a central region of the threaded section 12 and which has a large diameter end which opens on a free end 26 of the threaded section 12. An end portion of the threaded section 12 contains a series of three equally circumferentially spaced apart slots 28 which extend longitudinally from the free end 26 part way to the bolthead 14. The slots 28 open outwardly upon the exterior surface of the section 12 and extend radially inwardly into communication with the cavity 20 to thus permit a free end portion of the threaded section 12 to expand and contract as later more fully explained.

The expandable fastener assembly of the present example also includes an elongated draw rod or spindle 30 having a cylindrically shaped first end portion 32, the diameter of which is sized to slidably engage the first cavity segment 22 in relatively close fitting relationship, and a frusto-conically shaped second portion or boss 34. The surface of the boss 34 is tapered at a constant rate relative to the longitudinal axis 21 of both the bolt 10 and the spindle 30 when adjoined (See FIG. 4) which taper rate must be greater than the rate of taper of the defining surface of the second cavity segment 24 relative to the longitudinal axis 21 (See FIG. 4). The assembly also includes a threaded fastener in the form of a hex nut 36, tapped for engagement with a threaded end portion 38 of the spindle 30, and a generally circularly shaped, split locking ring 40.

To use the assembly as thus described, the spindle 30 is inserted by it's threaded end first into the bolt cavity 22 through it's opening on the free end 26 of the threaded bolt section 12. Thereafter, the bolt section 12 is threaded into the tapped bore 16 to a position wherein the free end of the boss 34 contacts a base 41 of the bore 16. With further insertion of the section 12 into the bore 16, the spindle 30 slides along the cavity 20 as the bolt 10 moves to a position wherein a surface portion of the boss 34 contacts the free end 26 of the threaded bolt section 12 around the opening to the cavity segment 24. This latter position of engagement is shown in FIG. 4. Thereafter, as the bolt section 12 is further inserted into the bore 16, the tapered boss 34 bears radially outwardly against the wall of the cavity segment 24 just inside the cavity opening and begins to force an extreme free end portion of the threaded section 12 to expand radially outwardly toward the surrounding threads of the bore 16. Now as the threaded bolt section 12 is further inserted into the bore 16, the base of the bore 16 urges the boss 34 further inwardly into the cavity section 24 to cause an inwardly lengthening end portion of the threaded bolt section 12 and of the cavity segment 24 to expand.

Eventually, the threads on an end portion of the bolt section 12 lock tightly at a desired maximum level of torque in and around the threads of the bore 16 to lock the bolt 10 to the engine block 18. Preferably, the components of the assembly should be sized such that this desired condition occurs at the position of the spindle 30 in the bore 16 wherein the boss 34 has deformed the taper of the cavity segment 24 to essentially match the taper of the boss 34. Such condition is illustrated in FIG. 5 wherein no annular gaps or spaces exist between the now deformed defining surface of the cavity segment 24 and the boss 34 anywhere along their opposing surfaces. Because there is no such gapping or spacing, the bolt 10 will not tend to wobble on and about the spindle 30 or vice versa as might otherwise occur with vibration and jerking about of two masses joined together by the assembly and which might even cause a rupture of the threaded bolt section 12 in the region of such gapping, all with attendant disastrous results.

Another feature of the subject invention is the means by which the spindle 30 is fastened and locked at a desired longitudinal position within the bolt cavity 20 to protect against accidental slippage thereof which could cause an undesired release of the bolt 10 from it's locking relation with the threaded engine block bore 16. Referring now particularly to FIGS. 1, 3 and 5 it will be seen that the bolthead 14 defines a first circular recess 42 eccentrically located within a second circular recess 44. The opening of the first cavity segment 22 is centered on the base of the first recess 42 and the diameter of the latter is sized to retain the nut 36 therein. The combined depth of both recesses 42 and 44 is less than the depth of the nut 36 so that a portion of the nut 36 which projects out of the recess 44 can be gripped with a wrench to tighten the nut 36 on the threaded end 38 of the spindle 30 (See particularly FIG. 5).

The second recess 44 is sized to retain the nut locking ring 40 therein when the latter is disposed about the nut 36 on the spindle 30 such that open end portions 46 of the ring 40 will bind between the defining wall of the recess 44 and two sides of the nut 36 as the nut 36 and end portions 46 are rotated toward a narrowest portion of the recess 44, as measured radially from it's defining wall to the nearest edge of the recess 42, and as the nut 36 is tightened on the spindle 30. FIG. 3 shows the end portions 46 of the ring 40 when so bound or wedged between the nut 36 and a wall portion of the recess 44. When it is desired to remove the bolt 10 from it's locked position in the bore 16, the locking ring 40 is simply wedged or snapped out of the recess 44 with the aid of a pin knife, screw driver or pair of locking ring pliers or other suitable tool so that the nut 36 can be loosened and removed from the spindle 30. With the nut 36 so removed, the bolthead 14 can be rotated to withdraw the bolt 10 from the bore 16. At the same time, the spindle boss 34 will tend to slide out of the cavity 20 through the bolt end 26 under pressure exerted thereon by the cavity defining wall of the surrounding threaded section 12 as the latter seeks to contact from it's previously expanded position. The resulting slippage of the boss 34 from the cavity 20, in turn, permits the threaded section 12 to contract, thus unlocking it from the surrounding threads of the bore 16. Consequently, the bolt 10 is readily removable from it's locked position in the bore 16 when desired, which has been a problem encountered using expandable fasteners of the prior art.

Figure 6:
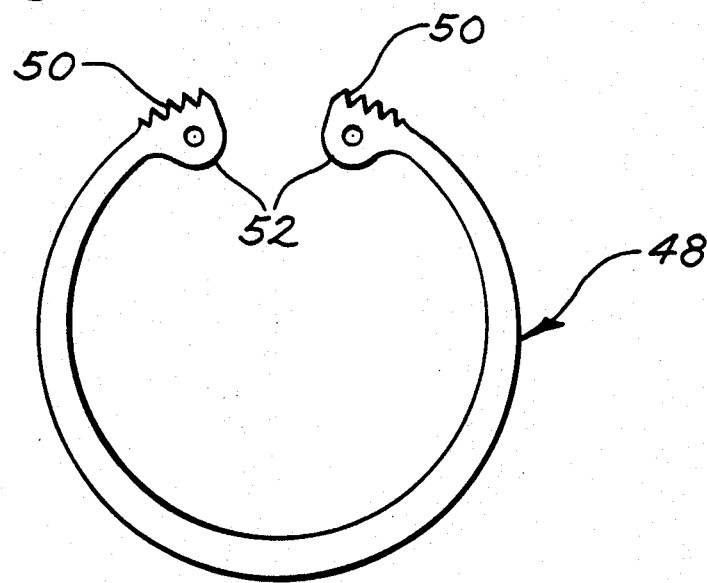
FIG. 6 shows a plan view of an alternative form of a split locking ring that may be used in the assembly of FIGS. 1, 3 and 5 in place of the locking ring shown therein.

FIG. 6 shows an alternative form of split circular locking ring 48 which contains serration 50 on outwardly facing edges of end portions 52. The ring 48 may be substituted in place of the locking ring 40 of FIGS. 1, 3 and 5 and operates in the same manner, except that the serration 50 tend to form a more positive lock with the defining wall of the second recess 44 than will the corresponding smooth edges of the end portions 46 of locking ring 40.

The fastening and locking means thus described can not only be used in association with the expandable fatener of the present invention, but can also be used advantageously with other expandable fastener assemblies to improve the locking and unlocking capability of those devices as well. It will also be appreciated that the expandable fastener assembly of this invention can readily be used in locking relation with other types of interiorly threaded members such as a simple hex nut, a suitably tapped machinery mounting bracket or flange, and the like, the threaded engine block bore 16 of the present example being but one example of many such uses.

Although the present invention has been described with respect to specific details of a certain preferred embodiment thereof, it is not intended that such details limit the scope of this patent other than as expressly set forth in the following claims.

We claim:

1. An expandable fastener assembly for use in locking relationship with an interiorly threaded member comprising a screw body having an expandable, exteriorly threaded section, said body defining a cavity extending therethrough which is co-axial with a longitudinal axis thereof, said cavity including a cylindrically shaped first segment extending from a first opening on a first end of said body to a position in a central region of said body, and a frusto-conically shaped second segment communicating with said first segment and extending at a first predetermined constant rate of taper to a second opening on a second end of said body, and an elongated spindle having a cylindrically shaped first end portion adapted for relatively close fitting slidable engagement with said first segment, and a second portion forming a frusto-conically shaped boss extending from connection with said first end portion at a second predetermined constant rate of taper which is greater than said first rate of taper, said boss being insertable by it's smaller end into said second opening and segment to radially expand said threaded section to lock said body in an interiorly threaded member, said screw body comprising a bolt which includes said exteriorly threaded section and a bolthead integrally attached to one end of said section, said first opening being on said bolthead, said bolthead defining a first circular recess disposed eccentrically within a second circular recess, said first opening being centered on a base of said first recess, said first recess being sized to retain a threaded fastener therein while being rotatably adjusted on a threaded end portion of said first spindle segment which projects out of said cavity through said first opening, said second recess being sized to retain a circular split locking ring therein when said ring is disposed about said threaded fastener and said threaded fastener is disposed in said first recess such that opposing ends of said ring bind between said threaded fastener and a peripheral wall of said second recess as opposing ends of said ring are rotated toward the narrowest spacing between the peripheries of said first and second recesses and as said threaded fastener is rotatably advanced on said first spindle end portion.

2. The assembly of claim 1 further comprising means for gripping said body with the aid of a tool to rotate said body to threadably advance and retract said body into and out of an interiorly threaded member.

3. The assembly of claim 2 wherein said gripping means is a bolthead integrally attached to said body, said first opening being on said bolthead.

4. The assembly of claim 3 wherein said bolthead comprises a hex shaped head.

5. The assembly of claim 1 further comprising means for fastening said spindle at a fixed position in said cavity to maintain said threaded section in an expanded state to, in turn, maintain said body in a locked position in an interiorly threaded member.

6. The assembly of claim 5 further comprising means for locking said fastening means to restrain said fastening means from movement which could cause said spindle to change it's position in said cavity to, in turn, cause said threaded section to accidentally contract and unlock from an interiorly threaded member with which it is engaged.

7. The assembly of claim 6 wherein said locking means comprises a circularly shaped, split locking ring.

8. The assembly of claim 7 wherein said split locking ring includes a pair of opposing end portions having serrated outwardly facing edges.

9. The assembly of claim 5 wherein said first portion of said spindle contains a threaded end segment, said fastening means comprising a fastener threadable onto said threaded end segment of said spindle, said spindle being of such length that said threaded end portion of said spindle projects out of said cavity beyond said first opening when said body is in a desired locking position in said cavity sufficiently to permit threadable engagement of said fastener with said threaded end segment of said spindle.

10. The assembly of claim 9 wherein said fastener comprises a hex nut.

11. The assembly of claim 1 wherein said expandable, exteriorly threaded section defines a series of elongated expansion slots circumferentially spaced apart which open outwardly onto at least an end portion of said threaded section and which extend radially inwardly to communicate with said cavity.

12. The assembly of claim 11 wherein said series is three.

13. The assembly of claim 1 wherein the axial lengths of said second segment and said boss are essentially equal.

14. An expandable fastener assembly for use in locking relationship with an interiorly threaded member comprising a screw body having an expandable, exteriorly threaded section, said body defining a cavity extending therethrough which is co-axial with a longitudinal axis thereof, said cavity including a cylindrically shaped first segment extending from a first opening on a first end of said body to a position in a central region of said body, and a frusto-conically shaped second segment communicating with said first segment and extending at a first predetermined constant rate of taper to a second opening on a second end of said body, and an elongated spindle having a cylindrically shaped first end portion adapted for relatively close fitting slidable engagement with said first segment, and a second portion forming a frusto-conically shaped boss extending from connection with said first end portion at a second predetermined constant rate of taper, said boss being insertable by it's smaller end into said second opening and segment to radially expand said threaded section to lock said body in an interiorly threaded member, said screw body comprising a bolt which includes said exteriorly threaded section and a bolthead integrally attached to one end of said section, said first opening being on said bolthead, said bolthead defining a first circular recess disposed eccentrically within a second circular recess, said first opening being centered on a base of said first recess, said first recess being sized to retain a threaded fastener therein while being rotatably adjusted on a threaded end portion of said first spindle segment which projects out of said cavity through said first opening, said second recess being sized to retain a circular split locking ring therein when said ring is disposed about said threaded fastener and said threaded fastener is disposed in said first recess such that opposing ends of said ring bind between said threaded fastener and a peripheral wall of said second recess as opposing ends of said ring are rotated toward the narrowest spacing between the peripheries of said first and second recesses and as said threaded fastener is rotatably advanced on said first spindle end portion.

15. An expandable fastener assembly for use in conjunction with an internally threaded member comprising:

an elongated screw body having a longitudinal axis, a first end and a second end and an exteriorally threaded end portion, said screw body defining an elongated cavity extending therethrough which is co-axial with said longitudinal axis and a series of circumferentially spaced apart expansion slots opening onto said threaded end portion and extending radially into said body to communicate with said cavity, said cavity having a cylindrically shaped segment extending from an interior end in said threaded end portion of said body to an opening on said first end, and a frusto-conically shaped segment joining the interior end of said cylindrically shaped segment and extending to an opening on said second end, the diameter of said frusto-conically shaped segment increasing at a first, predetermined constant rate moving from it's joinder with said cylindrically shaped segment to it's opening on said second, end;

an elongated spindle having a cylindrically shaped end portion adapted for close conforming, slidable disposition within said cylindrically shaped segment of said cavity and a frusto-conically shaped boss attached to one end of said cylindrically shaped end portion, the diameter of said boss increasing at a second predetermined constant rate moving from it's joinder with said one end portion to an end thereof, said second predetermined rate being greater than said first predetermined rate the axial lengths of said frusto-conically shaped segment of said cavity and of said boss being essentially equal;

means for releasably securing said spindle at a desired position in said cavity such that said screw body assembly can be locked at a desired position within an internally threaded member, and means for gripping said screw body for threadably advancing and retracting said screw body into and from an internally threaded member.

16. The assembly of claim 15 wherein said securing and gripping means comprise a bolthead attached to said first end of said screw body, said bolthead defining a first circular recess disposed eccentrically within a second circular recess, said opening on said first end being centered on a base of said first recess, said first recess being sized to retain a threaded fastener therein while being rotatably adjusted on a threaded end portion of the cylindrically shaped end portion of said spindle which projects out of said cavity through said first end opening, said second recess being sized to retain a circular split locking ring therein when said ring is disposed about said threaded fastener and said threaded fastener is disposed in said first recess such that opposing ends of said ring bind between said threaded fastener and a peripheral wall of said second recess as opposing ends of said ring are rotated toward the narrowest spacing between the peripheries of said first and second recesses and as said threaded fastener is rotatably advanced on said threaded end portion of said spindle.

17. The assembly of claim 16 wherein said securing means further comprises a split locking ring including a pair of opposing end portions having serrated outwardly facing edges.

18. An expandable fastener for use in locking relationship with an interiorly threaded member comprising an expandable bolt having an elongated, exteriorly threaded body and a bolthead attached to one end of said body, said bolt defining a cavity extending therethrough which is co-axial with a longitudinal axis thereof, said cavity including a cylindrically shaped first segment extending from a first opening on said bolthead to a position in a central region of said body, and a frusto-conically shaped second segment communicating with said first segment and extending to a second opening on a free end of said body, and an elongated spindle having a first cylindrically shaped portion adapted for relatively close fitting slidable engagement with said first segment, and a second portion forming a frusto-conically shaped boss connected to said first portion, said boss being insertable by it's smaller end into said second opening and segment to expand said threaded body to lock said bolt to an interiorly threaded member, said bolthead defining a first circular recess disposed eccentrically within a second circular recess, said first opening being centered on a base of said first recess and being sized to retain a threaded fastener therein while being rotatably adjusted on a threaded end portion of said first spindle segment which projects out of said cavity through said first opening, said second recess being sized to retain a circular split locking ring therein when said ring is disposed about said threaded fastener and said threaded fastener is disposed in said first recess such that opposing ends of said ring bind between said threaded fastener and a peripheral wall of said second recess as opposing ends of said ring are rotated toward the narrowest spacing between said first and second recesses as said threaded fastener is rotatably advanced on said first segment.

19. The expandable fastener of claim 18 wherein the axial lengths of said second segment and said boss are essentially equal.

* * * * *